US012763402B2

(12) United States Patent
Ding et al.

(10) Patent No.: US 12,763,402 B2
(45) Date of Patent: Oct. 13, 2026

(54) FLAME-RETARDANT, THERMAL-INSULATING, AND FIREPROOF MATERIAL FOR BATTERIES

(71) Applicant: Ningbo Booer New Material Co., Ltd, Ningbo (CN)

(72) Inventors: Kai Ding, Ningbo (CN); Xiaoli Shi, Ningbo (CN); Peiyan Pang, Ningbo (CN)

(73) Assignee: Ningbo Booer New Material Co., Ltd, Ningbo (CN)

( * ) Notice: Subject to any disclaimer, the term of this patent is extended or adjusted under 35 U.S.C. 154(b) by 312 days.

(21) Appl. No.: 18/293,965

(22) PCT Filed: Sep. 21, 2023

(86) PCT No.: PCT/CN2023/120328
§ 371 (c)(1),
(2) Date: Jan. 31, 2024

(87) PCT Pub. No.: WO2024/082911
PCT Pub. Date: Apr. 25, 2024

(65) Prior Publication Data

US 2025/0132421 A1 Apr. 24, 2025

(30) Foreign Application Priority Data

Oct. 18, 2022 (CN) ........................ 202211274999.X

(51) Int. Cl.

*H01M 10/658* (2014.01)
*B32B 5/02* (2006.01)
*B32B 5/26* (2006.01)
*F16L 59/02* (2006.01)
*H01M 50/242* (2021.01)

(52) U.S. Cl.

CPC ............ *H01M 10/658* (2015.04); *B32B 5/02* (2013.01); *B32B 5/26* (2013.01); *F16L 59/028* (2013.01); *H01M 50/242* (2021.01); *B32B 2250/20* (2013.01); *B32B 2255/02* (2013.01); *B32B 2255/10* (2013.01); *B32B 2262/101* (2013.01); *B32B 2264/101* (2013.01); *B32B 2264/107* (2013.01); *B32B 2307/304* (2013.01); *B32B 2307/3065* (2013.01); *B32B 2307/558* (2013.01); *B32B 2457/10* (2013.01)

(58) Field of Classification Search

CPC .......... B32B 5/00–5/32; H01M 10/00–10/667; D06M 11/00–11/84; C08L 83/00–83/16; C08K 3/40

See application file for complete search history.

(56) References Cited

U.S. PATENT DOCUMENTS

2021/0167438 A1* 6/2021 Evans ..................... B32B 5/022

FOREIGN PATENT DOCUMENTS

CN 106280446 A * 1/2017 ......... C08G 73/1067
CN 107141811 A * 9/2017 .............. C08L 83/04
WO WO-2021144758 A1 * 7/2021 .......... H01M 10/658

OTHER PUBLICATIONS

Machine translation of CN106280446. Retrieved Feb. 2, 2026.*
Machine translation of CN107141811. Retrieved Feb. 2, 2026.*
Lou et al. "Preparation and properties of ceramifiable flame-retarded silicone rubber composites", Journal of Thermal Analysis and Calorimetry, (2017); pp. 813-821.*

* cited by examiner

*Primary Examiner* — Prashant J Khatri
(74) *Attorney, Agent, or Firm* — Getech Law LLC; Jun Ye

(57) ABSTRACT

The present invention discloses a flame-retardant, thermal-insulating, and fireproof material for batteries, and relates to a silicone rubber flame-retardant and thermal-insulating material, which comprises a flame-retardant and thermal-insulating layer and an impact-resistant layer, wherein the flame-retardant and thermal-insulating layer comprises organic silicone rubber, a ceramic-forming filler, a flame retardant, an auxiliary agent, and glass powders with different initial melting temperatures, and molten-state temperature ranges of the glass powders cover 300° C. to 1500° C. Various glass powders with different molten-state temperature ranges are added to the material, so that when being burned to form a ceramic layer in the temperature range of 300° C. to 1500° C., the fireproof material always has glass powders in a molten state. The glass powders in the molten state can timely fill holes and cracks that appear at different temperatures in the ceramic layer, and ensure the continuity, integrity, and compactness of the ceramic layer as far as possible, so that the fireproof material has the characteristics of quick ceramic formation at a low temperature and high temperature resistance of about 1500° C. The problems that the existing glass powder has a single molten-state temperature range, holes are produced in the ceramic layer due to gasification of the glass powder at a high temperature, the structural compactness is reduced, and the ceramic layer is easily burned through are solved.

11 Claims, 3 Drawing Sheets

FLAME-RETARDANT, THERMAL-INSULATING, AND FIREPROOF MATERIAL FOR BATTERIES

CROSS-REFERENCE TO RELATED APPLICATIONS

The present application is a 371 of international Application PCT/CN2023/120328, filed Sep. 21, 2023, which claims the priority to Chinese Patent Application No. 202211274999.X, filed in China on Oct. 18, 2022. The contents of the applications are incorporated herein by reference in their entireties.

TECHNICAL FIELD

The present invention relates to a silicone rubber flame-retardant, thermal-insulating, and fireproof material, in particular to a flame-retardant, thermal-insulating, and fireproof material for new energy vehicle battery packs.

BACKGROUND

Generally, the thermal runaway probability of a battery is one in ten million. However, in an electric vehicle, after thousands of batteries are integrated to form a battery pack, the thermal runaway probability of the battery pack is increased to one in ten thousand, and one battery thermal runaway may cause the thermal runaway of the whole battery pack. The combustion temperature of the battery pack after the thermal runaway can reach 1500° C., and there is also a strong impact, which is a great challenge to the safety of the electric vehicle. Studies have shown that ceramic silicone rubber is currently the most suitable material scheme for use in new energy vehicle battery packs to prevent the continuous thermal runaway of cells and avoid the ignition of adjacent modules.

The ceramic silicone rubber is a ceramifiable polymer composite material, which has excellent performance of common polymers at room temperature and can form a compact ceramic structure at a high temperature so as to have ceramic characteristics. Due to the relatively high bond energy of Si—O bond in the silicone rubber, the silicone rubber itself has good thermal stability. In addition, when the silicone rubber is burned under a high-temperature flame, the Si—O bond can be converted into continuous, antioxidative, and insulating network $SiO_2$ ash to cover the surface of the cell, so that further ablation of the flame is effectively prevented. In addition, the smoke gas generated in the combustion process of the silicone rubber matrix is mainly $CO_2$ and $H_2O$ generated by the combustion of side chain groups, no toxic gas is generated, and no pollution is generated to the environment. Organic silicon polymers are used for preparing the ceramic silicone rubber, and have unique advantages in the aspects of process and raw material selection, as well as high temperature resistance and mechanical performance and the like of ceramic products.

The main principle of flame retardation, thermal insulation, and fireproofing of the ceramic silicone rubber is that the thermal stability of the silicone rubber is improved by adding a catalyst, a heat stabilizer, a refractory filler, glass powders, and the like, and then the generation and stability of a ceramic layer are promoted. Generally, the specific process of ceramization of the ceramic silicone rubber after combustion is that: when it is subjected to ablation or a high-temperature condition, the silicone rubber matrix first decomposes into amorphous $SiO_2$ and produces pores with different sizes; then, as the temperature rises, low-melting-point glass powder (also known as ceramic powder or ceramic-forming flux) first gradually melts, a liquid phase substance appears in the silicone rubber system, amorphous $SiO_2$ produced by the matrix and a temperature-resistant ceramic-forming filler (such as mica, kaolin, wollastonite, and the like) are connected, and a "eutectic mixture" is formed at the boundary of the filler, which is called a eutectic reaction; the eutectic mixture acts as a bridge between amorphous $SiO_2$ and the filler, thereby keeping the silicone rubber intact at an ignition temperature; finally, as time goes on, the temperature further raises, and the ceramic-forming filler and amorphous $SiO_2$ are more fully interpenetrated with the eutectic mixture, so that the boundary of the filler disappears, a new inorganic phase is generated, and a continuous, intact, and compact ceramic body structure is formed.

Chinese Patent No. CN110845850A discloses ceramifiable, halogen-free, and flame-retardant silicone rubber and a preparation method therefor. Chinese Patent No. CN107286636A discloses a low-smoke, flame-retardant, and ceramifiable thermoplastic polyurethane elastomer composite material, a preparation method therefor, and use thereof. Chinese Patent No. CN202111191443.X discloses a ceramic flame-retardant, thermal-insulating, and fireproof material, a preparation method therefor, and use thereof. The above patents all disclose ceramic silicone rubber and application methods therefor, but still have drawbacks in the protection of battery packs.

Generally, when the ceramic silicone rubber is burned at a high temperature, the reaction temperature of each component of the ceramic silicone rubber is very different, for example, the silicone rubber begins to decompose at 350° C. to generate amorphous $SiO_2$, and a plurality of pores with different sizes are generated on the surface of amorphous $SiO_2$; muscovite (a common ceramic-forming filler) begins to decompose above 700° C.; initial melting temperatures of common glass powders with different components are between 300° C. and 700° C. When a battery is subjected to thermal runaway, the combustion temperature can gradually reach 1500° C. and the thermal impact is accompanied, so that several problems are caused. If the initial melting temperature of the glass powder is relatively high (greater than 700° C.), the silicone rubber cannot form a continuous, intact, and compact ceramic body structure with the ceramic-forming filler and the glass powder in a low-temperature range (350° C. to 700° C.), and amorphous $SiO_2$ with the pores is easily damaged by the impact force and is then burned through. If the initial melting temperature of the glass powder is relatively low (less than 700° C.), the glass powder can volatilize into a gas phase in a high-temperature range (above 1200° C.), and holes are produced on a skeleton structure of the ceramic body, so that the compactness of the ceramic body structure is reduced, and the ceramic body is easily burned through due to the thermal impact.

Currently, glass powder with only one initial melting temperature is added to the disclosed ceramic silicone rubber, that is, the glass powder in the existing materials cannot completely encompass a molten-state temperature range of 300-1500° C., so that the above problems always occur.

SUMMARY

Aiming at the defects in the prior art, the present invention provides a flame-retardant, thermal-insulating, and fireproof material for batteries. In the present invention, various glass powders with different molten-state temperature ranges are added, so that when being burned at 300° C. to 1500° C., the fireproof material always has glass powders in a molten state inside. These glass powders in the molten state can timely fill holes and cracks that appear at different temperatures in a ceramic layer formed by the eutectic of $SiO_2$ ash and a refractory filler, and ensure the continuity, integrity, and compactness of the ceramic layer as far as possible, so that the fireproof material has the characteristics of quick ceramic formation at a low temperature and high temperature resistance of above 1500° C. In the existing materials, the problems that the glass powder has a single molten-state temperature range, high-melting-point glass powder cannot timely melt to fill gaps of the ceramic layer at a low temperature, low-melting-point glass powder is easily gasified at a high temperature to cause holes in the ceramic phase, the structural compactness is reduced, and the ceramic layer is easily burned through are solved.

The present invention solves the above technical problems by the following technical scheme: provided is a flame-retardant, thermal-insulating, and fireproof material for batteries, comprising a flame-retardant and thermal-insulating layer and an impact-resistant layer, wherein the flame-retardant and thermal-insulating layer is applied to the surface of the impact-resistant layer; the flame-retardant and thermal-insulating layer and the impact-resistant layer are in a thickness ratio of (2-10):1; the flame-retardant and thermal-insulating layer comprises organic silicone rubber, a ceramic-forming filler, a flame retardant, and an auxiliary agent, and further comprises several glass powders with different initial melting temperatures, and the molten-state temperature ranges of the several glass powders cover 300° C. to 1500° C.

In the above technical scheme, optionally, the impact-resistant layer is glass fiber cloth.

In the above technical scheme, optionally, the impact-resistant layer is formed by bonding multiple layers of glass fiber cloth.

In the above technical scheme, optionally, the glass powders comprise glass powder A with a molten-state temperature range encompassing 300° C. to 700° C. and glass powder B with a molten-state temperature range encompassing 700° C. to 1500° C. The glass powder A and the glass powder B are in a ratio of (1-2):(1-3) by mass ratio.

In the above technical scheme, optionally, the glass powders comprise glass powder C with a molten-state temperature range encompassing 300° C. to 550° C., glass powder D with a molten-state temperature range encompassing 550° C. to 900° C., and glass powder E with a molten-state temperature range encompassing 900° C. to 1500° C. The glass powder C, the glass powder D, and the glass powder E are in a ratio of (1-2):(1-2):(2-3) by mass ratio.

In the above technical scheme, optionally, the glass powders comprise glass powder F with a molten-state temperature range encompassing 300° C. to 800° C., glass powder G with a molten-state temperature range encompassing 600° C. to 1000° C., glass powder H with a molten-state temperature range encompassing 700° C. to 1250° C., and glass powder I with a molten-state temperature range encompassing 1000° C. to 1500° C. The glass powder F, the glass powder G, the glass powder H, and the glass powder I are in a ratio of (1-3):(1-3):(1-3):(1-3) by mass ratio.

In the above technical scheme, optionally, raw materials of the glass powder comprise one or more selected from silicon oxide, boron oxide, and a metal oxide. The metal oxide includes one or more selected from lead oxide, aluminum oxide, lithium oxide, zinc oxide, titanium oxide, magnesium oxide, vanadium oxide, barium oxide, sodium oxide, calcium oxide, strontium oxide, tin oxide, bismuth oxide, and antimony oxide.

In the above technical scheme, optionally, the raw materials of the glass powder further comprise stannous fluoride.

In the above technical scheme, optionally, the flame-retardant and thermal-insulating layer comprises 40-60 parts of the organic silicone rubber, 20-30 parts of the ceramic-forming filler, 15-25 parts of the flame retardant, 2-10 parts of the glass powders, and 2-5 parts of the auxiliary agent.

In the above technical scheme, optionally, the flame-retardant and thermal-insulating layer further comprises 10-17 parts of an extending filler.

In the above technical scheme, optionally, the flame-retardant, thermal-insulating, and fireproof material will not be burned through under flame impingement at 1500° C. for at least 30 min.

The glass powder is generally prepared by fully mixing $SiO_2$, $B_2O_3$, $Al_2O_3$, PbO, and some metal oxides according to a certain proportion, melting, water quenching, and crushing. Adjusting the proportion of different components and adding different metal oxides can make the initial melting temperature and the molten-state temperature range of the glass powder slightly different.

When the lithium battery is subjected to thermal runaway, a deflagration phenomenon, namely high-temperature combustion accompanied with impact, can occur. The silicone rubber begins to decompose at 350° C. to generate amorphous $SiO_2$, and a plurality of pores with different sizes are produced. Then, the glass powder needs to be melted, begin to form a liquid phase that fills the pores, and connect amorphous $SiO_2$ to the ceramic-forming filler, so that the fireproof material remains stable under combustion and impact. Therefore, the initial melting temperature of the glass powder in the existing materials is mostly selected between 300° C. and 700° C.; the glass powder melts after the silicone rubber begins to decompose, and the pores are filled as early as possible, but the glass powder with the initial melting temperature between 300° C. and 700° C. basically has a molten-state temperature range of no more than 1000° C., that is, when the burning temperature is higher than the molten-state temperature range of the glass powder, the glass powder volatilizes into a gas phase, and holes can be produced in the formed ceramic layer, so that the compactness of the whole structure of the ceramic layer is reduced, and the existing fireproof material is likely to be burned through by a flame at 1000° C. to 1500° C. under the double actions of thermal impact and combustion, causing the failure of the fireproof material. Moreover, the thermal impact occurs in the whole combustion process, this type of impact easily causes cracks that appear in the ceramic layer, and failure to repair the cracks after they appear will also cause the failure of the whole fireproof material, that is, the holes and the cracks are required to be filled with the glass powder in the molten state at any time in the whole process of burning the fireproof material, and the ceramic layer is still continuous, intact, and compact until the temperature reaches 1500° C.

Therefore, the present application adopts a mixture of glass powders with various initial melting temperatures, so that the glass powders have various molten-state temperature ranges encompassing 300° C. to 1500° C., so that no matter how high the burning temperature of the fireproof material is, the glass powders are always in the molten state to fill the holes and the cracks of the ceramic layer, the continuity, integrity, and compactness of the ceramic layer are ensured as far as possible, and the ceramic layer plays the maximum thermal insulation and flame retardant effects.

Compared with the prior art, various glass powders with different molten-state temperature ranges are added according to the present invention, so that there always are glass powders in a molten state within a temperature range of 300° C. to 1500° C., and the glass powders in the molten state can timely fill holes and cracks that appear at different temperatures on the ceramic layer, and ensure the continuity, integrity, and compactness of the ceramic layer as far as possible. Therefore, the flame-retardant, thermal-insulating, and fireproof material for batteries has the characteristics of quick ceramic formation at a low temperature and high temperature resistance of about 1500° C. In the existing materials, the problems that the glass powder has a single molten-state temperature range, high-melting-point glass powder cannot timely melt to fill gaps of the ceramic layer at a low temperature, low-melting-point glass powder is easily gasified at a high temperature to cause holes in the ceramic layer, the structural compactness is reduced, and the ceramic layer is easily burned through are solved.

DETAILED DESCRIPTION

Figure 1:
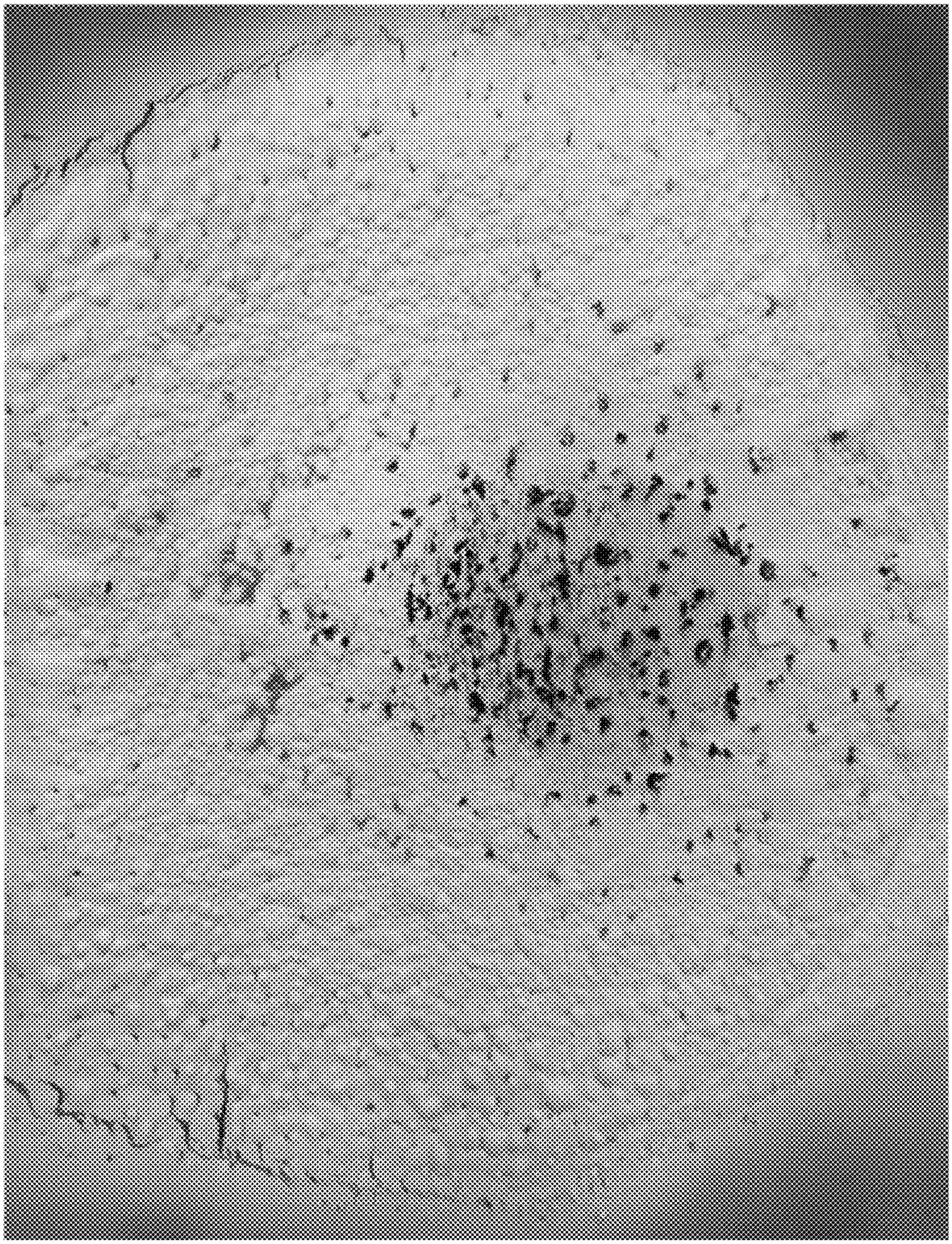
FIG. 1 is a picture showing a ceramic intact state of a flame-retardant, thermal-insulating, and fireproof material for batteries prepared in Example 17 of the present invention after a deflagration test under flame impingement at 1500° C. and 5 standard atmospheres for 15 min.

For the purpose of facilitating an understanding of the present invention, the following examples are set forth herein. It should be understood by those skilled in the art that the examples are only intended to help understand the present invention and should not be construed as the specific limitation of the present invention.

In the examples of the present application, organic silicone rubber is any one of or a combination of at least two of liquid silicone rubber, methyl vinyl silicone rubber, or methyl phenyl vinyl silicone rubber. In the following examples and comparative examples, the organic silicone rubber is methyl vinyl silicone rubber: 1103, from Guangzhou Siyou New Material Technology Co., Ltd. It is not limited to methyl vinyl silicone rubber in practical applications.

The ceramic-forming filler is any one of or a combination of at least two of muscovite, phlogopite, kaolin, brucite, and talcum powder. In the following examples and comparative examples, the ceramic-forming filler is muscovite, from Guangdong Yongfeng Chemical Co., Ltd. It is not limited to muscovite in practical applications.

The extending filler is any one of or a combination of at least two of diatomite, wollastonite, calcium carbonate, and fumed silica. In the following examples and comparative examples, the extending filler includes diatomite, from Guangzhou Haozhao Chemical Co., Ltd.; calcium carbonate: 325-6250 (mesh), from Dongguan Xinke New Material Co., Ltd.; nanosilica: KS-8200, from Jinan Kasong Chemical Co., Ltd. Diatomite, calcium carbonate, and nanosilica are in a mass ratio of 0.8:1:3, and it is not limited to the mixture of the above materials in practical applications.

The flame retardant is any one of or a combination of at least two of antimony trioxide, aluminum hydroxide, magnesium hydroxide, a phosphorus-containing inorganic flame retardant, a boron-containing inorganic flame retardant, and a phosphorus-containing organic flame retardant. In the following examples and comparative examples, the flame retardant includes aluminum hydroxide, from Hefei Zhongke Flame-Retardant New Material Co., Ltd.; a phosphorus-containing inorganic flame retardant, from Shijiazhuang Xinsheng Chemical Co., Ltd.; a phosphorus-containing organic flame retardant, from Zhengzhou Hanshuo Chemical Raw Materials Co., Ltd. Aluminum hydroxide, the phosphorus-containing inorganic flame retardant, and the phosphorus-containing organic flame retardant are in a mass ratio of 3:0.9:1.3, and it is not limited to the mixture of the above materials in practical applications.

The auxiliary agent includes a silane coupling agent, a silicone oil, and a vulcanizing agent, wherein the vulcanizing agent is one of benzoyl peroxide, tert-butyl perbenzoate, di-tert-butyl peroxide, dicumyl peroxide, 2,5-dimethyl-2,5-di-tert-butyl hexane peroxide, and a platinum vulcanizing agent. In the following examples and comparative examples, the auxiliary agent is a silane coupling agent and a silicone oil, from Jiangsu Quan Li Chemical Co., Ltd; the vulcanizing agent is benzoyl peroxide. The silane coupling agent, the silicone oil, and benzoyl peroxide are in a mass ratio of 0.5:5:1.8, and it is not limited to the mixture of the above materials in practical applications.

The glass powder is any one of or a combination of at least two of silicon oxide, boron oxide, and a metal oxide, wherein the metal oxide is any one of or a combination of at least two of lead oxide, aluminum oxide, lithium oxide, zinc oxide, titanium oxide, magnesium oxide, vanadium oxide, barium oxide, sodium oxide, calcium oxide, strontium oxide, tin oxide, bismuth oxide, and antimony oxide. Some glass powders further comprise stannous fluoride. The glass powder has various initial melting temperatures and molten-state temperature encompassing ranges according to different components and proportions, and in the present application, the molten-state temperature encompassing range only indicates that the glass powder is in a molten state within this range, the temperatures of two end points are not a melting point and a boiling point, and the glass powder can also be in a molten state outside the temperature encompassing range.

In the following examples and comparative examples, the glass powder is provided by Guangzhou Billion Peak Chemical Technology Co., Ltd. as required by the applicant or is self-prepared by the applicant.

In the examples of the present application, glass powder A comprises components of $SnF_2$, $P_2O_5$, $SiO_2$, $Sb_2O_3$, and $Bi_2O_3$, including, in parts by mass, 40-50 parts of $SnF_2$, 35-45 parts of $P_2O_5$, 1-7 parts of $SiO_2$, 1-7 parts of $Sb_2O_3$, and 1-7 parts of $Bi_2O_3$. Optionally, the glass powder A comprises components of 45 parts of $SnF_2$, 40 parts of $P_2O_5$, 5 parts of $SiO_2$, 5 parts of $Sb_2O_3$, and 5 parts of $Bi_2O_3$. The glass powder A has a molten-state temperature range encompassing 300° C. to 700° C. In practical applications, no matter the components of the glass powder A, it is only necessary that the molten-state temperature range of the glass powder A encompasses 300° C. to 700° C., and the above is only an example of the components of the glass powder A.

Glass powder B comprises components of $SiO_2$, $B_2O_3$, and PbO, including, in parts by mass, 25-35 parts of $SiO_2$, 10-15 parts of $B_2O_3$, and 15-25 parts of PbO. Optionally, the glass powder B comprises 30 parts of $SiO_2$, 11 parts of $B_2O_3$, and 22 parts of PbO. The glass powder B has a molten-state temperature range encompassing 700° C. to 1500° C. In practical applications, no matter the components of the glass powder B, it is only necessary that the molten-state temperature range of the glass powder B encompasses 700° C. to 1500° C., and the above is only an example of the components of the glass powder B.

Glass powder C comprises components of $SnF_2$, $P_2O_5$, $V_2O_5$, $Sb_2O_3$, and $Bi_2O_3$, including, in parts by mass, 45-55 parts of $SnF_2$, 30-40 parts of $P_2O_5$, 1-7 parts of $V_2O_5$, 1-7 parts of $Sb_2O_3$, and 1-7 parts of $Bi_2O_3$. Optionally, the glass powder C comprises 50 parts of $SnF_2$, 35 parts of $P_2O_5$, 5 parts of $V_2O_5$, 5 parts of $Sb_2O_3$, and 5 parts of $Bi_2O_3$. The glass powder C has a molten-state temperature range encompassing 300° C. to 550° C. In practical applications, no matter the components of the glass powder C, it is only necessary that the molten-state temperature range of the glass powder C encompasses 300° C. to 550° C., and the above is only an example of the components of the glass powder C.

Glass powder D comprises components of $SiO_2$, $TiO_2$, $B_2O_3$, and PbO, including, in parts by mass, 10-15 parts of $SiO_2$, 1-5 parts of $TiO_2$, 10-15 parts of $B_2O_3$, and 15-20 parts of PbO. Optionally, the glass powder D comprises 14 parts of $SiO_2$, 2 parts of $TiO_2$, 12 parts of $B_2O_3$, and 17 parts of PbO. The glass powder D has a molten-state temperature range encompassing 550° C. to 900° C. In practical applications, no matter the components of the glass powder D, it is only necessary that the molten-state temperature range of the glass powder D encompasses 550° C. to 900° C., and the above is only an example of the components of the glass powder D.

Glass powder E comprises components of $SiO_2$ and PbO, including, in parts by mass, 30-40 parts of $SiO_2$ and 20-25 parts of PbO. Optionally, the glass powder E comprises 35 parts of $SiO_2$ and 20 parts of PbO. The glass powder E has a molten-state temperature range encompassing 900° C. to 1500° C. In practical applications, no matter the components of the glass powder E, it is only necessary that the molten-state temperature range of the glass powder E encompasses 900° C. to 1500° C., and the above is only an example of the components of the glass powder E.

Glass powder F comprises components of $SnF_2$, $P_2O_5$, $SiO_2$, $Bi_2O_3$, and $V_2O_5$, including, in parts by mass, 35-45 parts of $SnF_2$, 35-45 parts of $P_2O_5$, 1-7 parts of $V_2O_5$, 5-15 parts of $SiO_2$, and 1-7 parts of $Bi_2O_3$. Optionally, the glass powder F comprises components of 40 parts of $SnF_2$, 40 parts of $P_2O_5$, 5 parts of $V_2O_5$, 10 parts of $SiO_2$, and 5 parts of $Bi_2O_3$. The glass powder F has a molten-state temperature range encompassing 300° C. to 800° C. In practical applications, no matter the components of the glass powder F, it is only necessary that the molten-state temperature range of the glass powder F encompasses 300° C. to 800° C., and the above is only an example of the components of the glass powder F.

Glass powder G comprises components of $SiO_2$, $TiO_2$, $B_2O_3$, and PbO, including, in parts by mass, 10-20 parts of $SiO_2$, 7-13 parts of $TiO_2$, 10-15 parts of $B_2O_3$, and 10-15 parts of PbO. Optionally, the glass powder G comprises 15 parts of $SiO_2$, 10 parts of $TiO_2$, 13 parts of $B_2O_3$, and 12 parts of PbO. The glass powder G has a molten-state temperature range encompassing 600° C. to 1000° C. In practical applications, no matter the components of the glass powder G, it is only necessary that the molten-state temperature range of the glass powder G encompasses 600° C. to 1000° C., and the above is only an example of the components of the glass powder G.

Glass powder H comprises components of $SiO_2$, $B_2O_3$, $TiO_2$, and PbO, including, in parts by mass, 15-20 parts of $SiO_2$, 10-15 parts of $TiO_2$, 10-20 parts of $B_2O_3$, and 15-25 parts of PbO. Optionally, the glass powder H comprises 17 parts of $SiO_2$, 12 parts of $TiO_2$, 15 parts of $B_2O_3$, and 20 parts of PbO. The glass powder H has a molten-state temperature range encompassing 700° C. to 1250° C. In practical applications, no matter the components of the glass powder H, it is only necessary that the molten-state temperature range of the glass powder H encompasses 700° C. to 1250° C., and the above is only an example of the components of the glass powder H.

Glass powder I comprises components of $SiO_2$ and PbO, including, in parts by mass, 25-35 parts of $SiO_2$ and 10-15 parts of PbO. Optionally, the glass powder I comprises 30 parts of $SiO_2$ and 13 parts of PbO. The glass powder I has a molten-state temperature range encompassing 1000° C. to 1500° C. In practical applications, no matter the components of the glass powder I, it is only necessary that the molten-state temperature range of the glass powder I encompasses 1000° C. to 1500° C., and the above is only an example of the components of the glass powder I.

Example 1: The flame-retardant and thermal-insulating layer comprised, in parts by mass, 40 parts of organic silicone rubber, 20 parts of a ceramic-forming filler, 10 parts of an extending filler, 15 parts of a flame retardant, 2 parts of glass powders, and 2 parts of an auxiliary agent. The glass powders comprised glass powder A and glass powder B. The glass powder A and the glass powder B were in a mass ratio of 1:1. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 10:1, and the total thickness of the material was 2 mm.

Example 2: The flame-retardant and thermal-insulating layer comprised, in parts by mass, 60 parts of organic silicone rubber, 30 parts of a ceramic-forming filler, 17 parts of an extending filler, 25 parts of a flame retardant, 10 parts of glass powders, and 5 parts of an auxiliary agent. The glass powders comprised glass powder C, glass powder D, and glass powder E. The glass powder C, the glass powder D, and the glass powder E were in a mass ratio of 1:1:2. The impact-resistant layer was three layers of glass fiber cloth; the flame-retardant and thermal-insulating layer was bonded to the impact-resistant layer; the flame-retardant and thermal-insulating layer and the impact-resistant layer were in a thickness ratio of 2:1, and the total thickness of the material was 1 mm.

Example 3: The flame-retardant and thermal-insulating layer comprised, in parts by mass, 50 parts of organic silicone rubber, 25 parts of a ceramic-forming filler, 15 parts of an extending filler, 20 parts of a flame retardant, 6 parts of glass powders, and 3 parts of an auxiliary agent. The glass powders comprised glass powder F, glass powder G, glass powder H, and glass powder I. The glass powder F, the glass powder G, the glass powder H, and the glass powder I were in a mass ratio of 1:1:1:1. The impact-resistant layer was two layers of glass fiber cloth; the flame-retardant and thermal-insulating layer was bonded to the impact-resistant layer; the flame-retardant and thermal-insulating layer and the impact-resistant layer were in a thickness ratio of 6:1, and the total thickness of the material was 2.5 mm.

Example 4: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powders comprised glass powder A and glass powder B, and the glass powder A and the glass powder B were in a mass ratio of 1:1. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Example 5: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powders comprised glass powder A and glass powder B, and the glass powder A and the glass powder B were in a mass ratio of 1:2. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Example 6: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powders comprised glass powder A and glass powder B, and the glass powder A and the glass powder B were in a mass ratio of 2:3. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Example 7: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powders comprised glass powder C, glass powder D, and glass powder E. The glass powder C, the glass powder D, and the glass powder E were in a mass ratio of 1:1:2. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Example 8: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powders comprised glass powder C, glass powder D, and glass powder E. The glass powder C, the glass powder D, and the glass powder E were in a mass ratio of 1:2:3. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Example 9: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powders comprised glass powder C, glass powder D, and glass powder E. The glass powder C, the glass powder D, and the glass powder E were in a mass ratio of 2:2:3. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Example 10: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powders comprised glass powder F, glass powder G, glass powder H, and glass powder I. The glass powder F, the glass powder G, the glass powder H, and the glass powder I were in a mass ratio of 1:1:1:1. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Example 11: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powders comprised glass powder F, glass powder G, glass powder H, and glass powder I. The glass powder F, the glass powder G, the glass powder H, and the glass powder I were in a mass ratio of 1:1:2:2. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Example 12: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powders comprised glass powder F, glass powder G, glass powder H, and glass powder I. The glass powder F, the glass powder G, the glass powder H, and the glass powder I were in a mass ratio of 1:2:2:3. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Example 13: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powders comprised glass powder F, glass powder G, glass powder H, and glass powder I. The glass powder F, the glass powder G, the glass powder H, and the glass powder I were in a mass ratio of 1:1:1:2. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Example 14: The flame-retardant and thermal-insulating layer comprised, in parts by mass, 52 parts of organic silicone rubber, 27 parts of a ceramic-forming filler, 17 parts of an extending filler, 23 parts of a flame retardant, 5 parts of glass powders, and 2 parts of an auxiliary agent. The rest of the description was the same as that in Example 12.

Example 15: The flame-retardant and thermal-insulating layer comprised, in parts by mass, 47 parts of organic silicone rubber, 25 parts of a ceramic-forming filler, 15 parts of an extending filler, 20 parts of a flame retardant, 4 parts of glass powders, and 2 parts of an auxiliary agent. The rest of the description was the same as that in Example 12.

In the above examples, the amounts of the glass powders with different initial melting temperatures are not limited to the disclosure of the present application, as long as the molten-state temperature of the glass powder encompasses 300° C. to 1500° C. That is, the mixing of the glass powders is not limited to the mixing of the glass powder A and the glass powder B, the mixing of the glass powder C, the glass powder D, and the glass powder E, and the mixing of the glass powder F, the glass powder G, the glass powder H, and the glass powder I; these glass powders can be mixed with each other as long as the requirements are met. Moreover, it is not limited to the glass powder A, the glass powder B, the glass powder C, the glass powder D, the glass powder E, the glass powder F, the glass powder G, the glass powder H, and the glass powder I disclosed in the present application; the glass powders can be mixed with each other as long as the requirements of the molten-state temperature range are met.

Example 16: The flame-retardant and thermal-insulating layer comprised, in parts by mass, 47 parts of organic silicone rubber, 25 parts of a ceramic-forming filler, 15 parts of an extending filler, 20 parts of a flame retardant, 4 parts of glass powders, and 2 parts of an auxiliary agent. The glass powders comprised glass powder A, glass powder G, glass powder H, and glass powder I. The glass powder A, the glass powder G, the glass powder H, and the glass powder I were in a mass ratio of 1:1:2:2. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Example 17: The flame-retardant and thermal-insulating layer comprised, in parts by mass, 47 parts of organic silicone rubber, 25 parts of a ceramic-forming filler, 15 parts of an extending filler, 20 parts of a flame retardant, 4 parts of glass powders, and 2 parts of an auxiliary agent. The glass powders comprised glass powder A, glass powder G, glass powder H, and glass powder E. The glass powder A, the glass powder G, the glass powder H, and the glass powder E were in a mass ratio of 1:1:1:2. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

In the above examples, the glass powders with different initial melting temperatures were separately mixed with the organic silicone rubber, the ceramic-forming filler, the extending filler, or the flame retardant, and the glass powders with different initial melting temperatures could not be mixed together before being mixed with the organic silicone rubber, the ceramic-forming filler, the extending filler, or the flame retardant.

Comparative Example 1: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powder was glass powder A. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Comparative Example 2: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powder was glass powder B. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Comparative Example 3: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powder was glass powder C. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Comparative Example 4: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powder was glass powder D. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Comparative Example 5: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powder was glass powder E. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Comparative Example 6: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powder was glass powder F. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Comparative Example 7: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powder was glass powder G. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Comparative Example 8: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powder was glass powder H. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

Comparative Example 9: The flame-retardant and thermal-insulating layer comprised, in parts by mass, 45 parts of organic silicone rubber, 27 parts of a ceramic-forming filler, 14 parts of an extending filler, 22 parts of a flame retardant, 8 parts of glass powders, and 2 parts of an auxiliary agent. The glass powder was glass powder I. The impact-resistant layer was a single layer of glass fiber cloth; the flame-retardant and thermal-insulating layer was bonded to the impact-resistant layer; the flame-retardant and thermal-insulating layer and the impact-resistant layer were in a thickness ratio of 4:1, and the total thickness of the material was 1 mm.

The flame-retardant and thermal-insulating layer and the impact-resistant layer in all the examples and the comparative examples are bonded, that is, the flame-retardant, thermal-insulating, and fireproof material for batteries was obtained by the following preparation method:

S1: separately mixing glass powders with different initial melting temperatures with organic silicone rubber, a ceramic-forming filler, an extending filler, a flame retardant, and other auxiliary agents except a vulcanizing agent in batches by an internal mixer, and then mixing together to obtain a rubber mix;

S2: putting the rubber mix into a vulcanizing machine, and adding the vulcanizing agent to obtain a flame-retardant, thermal-insulating, and fireproof silica gel; and S3: applying the flame-retardant, thermal-insulating, and fireproof silica gel to an impact-resistant layer (i.e., glass fiber cloth), calendering, and controlling the vulcanization temperature at 130-160° C.

Finally, the flame-retardant, thermal-insulating, and fireproof material for batteries was obtained.

The performance tests were performed on the materials in Examples 4-17. The test standards and results are as follows:

Density: ASTM D792-2013; a densimeter. The materials in Examples 4-17 had densities of 1.6±0.1 g/cm$^3$.

Tensile strength: ASTM D412; a tensile machine. The materials in Examples 4-17 had tensile strengths greater than 15 MPa.

Flame retardancy: UL94; a horizontal and vertical combustion tester. The materials in Examples 4-17 had flame retardancy of V0.

Coefficient of thermal conductivity: ASTM D5470; a thermal conductivity tester. The materials in Examples 4-17 had a coefficient of thermal conductivity less than or equal to 0.3 W/(m·k).

Withstand voltage: a voltage adjusted to 2700 V DC, time 60 s, and a leakage current; a withstand voltage tester. The materials in Examples 4-17 had leakage currents less than 1 mA.

Insulation: a voltage adjusted to 1000 V DC, time 60 s, and a resistance; an insulation tester. The materials in Examples 4-17 had resistances greater than 1 GQ.

Voltage breakdown: ASTM D149; a voltage breakdown tester. The materials in Examples 4-17 had breakdown voltages greater than 20 kv.

Hardness: ASTM D2240; a hardness tester. The materials in Examples 4-17 had hardnesses of 65±7 Shore A.

Water absorption: a water absorption mass ratio within 24 h. The materials in Examples 4-17 had water absorption mass ratios less than or equal to 3%.

Ozone aging resistance: ASTM D1171, ozone concentration 2 ppm, temperature 23° C., humidity 65%, stretching 15%, and moisture preservation for 46 h. The materials in Examples 4-17 had no cracks.

Low-temperature performance: −40° C./24 h, folding 180°. The materials in Examples 4-17 had no cracks.

Long-term weather resistance: between −40° C. and 85° C., performing 500 cycles with a temperature gradient not exceeding 5° C./min; in each cycle, staying at a high temperature and a low temperature for 15 min individually; 85° C., 85% humidity, and 1000 h; aging at 120° C. for 1200 h. After the materials in Examples 4-17 were individually subjected to high-low temperature cycles, high temperature and high humidity, as well as high-temperature aging, all the above performances could still meet the standard requirements.

The materials in Examples 4-17 and Comparative Examples 1-9 were subjected to deflagration tests at different pressures, as shown in Table 1.

TABLE 1

Deflagration tests for materials in Examples 4-17 and Comparative Examples 1-9 in the state of bonding glass fiber

| | Flame impingement at 1500° C. and 1 standard atmosphere for 30 min | Flame impingement at 1500° C. and 3 standard atmospheres for 30 min | Flame impingement at 1500° C. and 5 standard atmospheres for 30 min | Flame impingement at 1500° C. and 5 standard atmospheres for 15 min | Flame impingement at 1500° C. and 7 standard atmospheres for 15 min | Flame impingement at 1500° C. and 10 standard atmospheres for 15 min |
|---|---|---|---|---|---|---|
| Example 4 | Ceramic integrity | Ceramic integrity | Ceramic crack | Ceramic crack | Ceramic breakdown | Ceramic breakdown |
| Example 5 | Ceramic integrity | Ceramic integrity | Ceramic crack | Ceramic integrity | Ceramic breakdown | Ceramic breakdown |

TABLE 1-continued

Deflagration tests for materials in Examples 4-17 and Comparative Examples 1-9 in the state of bonding glass fiber

| | Flame impingement at 1500° C. and 1 standard atmosphere for 30 min | Flame impingement at 1500° C. and 3 standard atmospheres for 30 min | Flame impingement at 1500° C. and 5 standard atmospheres for 30 min | Flame impingement at 1500° C. and 5 standard atmospheres for 15 min | Flame impingement at 1500° C. and 7 standard atmospheres for 15 min | Flame impingement at 1500° C. and 10 standard atmospheres for 15 min |
|---|---|---|---|---|---|---|
| Example 6 | Ceramic integrity | Ceramic integrity | Ceramic crack | Ceramic integrity | Ceramic crack | Ceramic breakdown |
| Example 7 | Ceramic integrity | Ceramic integrity | Ceramic crack | Ceramic integrity | Ceramic crack | Ceramic breakdown |
| Example 8 | Ceramic integrity | Ceramic integrity | Ceramic crack | Ceramic integrity | Ceramic breakdown | Ceramic breakdown |
| Example 9 | Ceramic integrity | Ceramic integrity | Ceramic crack | Ceramic integrity | Ceramic breakdown | Ceramic breakdown |
| Example 10 | Ceramic integrity | Ceramic integrity | Ceramic crack | Ceramic crack | Ceramic breakdown | Ceramic breakdown |
| Example 11 | Ceramic integrity | Ceramic integrity | Ceramic crack | Ceramic integrity | Ceramic crack | Ceramic breakdown |
| Example 12 | Ceramic integrity | Ceramic integrity | Ceramic crack | Ceramic integrity | Ceramic crack | Ceramic breakdown |
| Example 13 | Ceramic integrity | Ceramic integrity | Ceramic crack | Ceramic integrity | Ceramic crack | Ceramic breakdown |
| Example 14 | Ceramic integrity | Ceramic integrity | Ceramic crack | Ceramic integrity | Ceramic crack | Ceramic breakdown |
| Example 15 | Ceramic integrity | Ceramic integrity | Ceramic crack | Ceramic integrity | Ceramic crack | Ceramic breakdown |
| Example 16 | Ceramic integrity | Ceramic integrity | Ceramic crack | Ceramic integrity | Ceramic crack | Ceramic breakdown |
| Example 17 | Ceramic integrity | Ceramic integrity | Ceramic crack | Ceramic integrity | Ceramic crack | Ceramic breakdown |
| Comparative Example 1 | Ceramic integrity | Ceramic crack | Ceramic breakdown | Ceramic breakdown | Ceramic breakdown | Ceramic breakdown |
| Comparative Example 2 | Ceramic integrity | Ceramic crack | Ceramic breakdown | Ceramic breakdown | Ceramic breakdown | Ceramic breakdown |
| Comparative Example 3 | Ceramic integrity | Ceramic crack | Ceramic breakdown | Ceramic breakdown | Ceramic breakdown | Ceramic breakdown |
| Comparative Example 4 | Ceramic integrity | Ceramic breakdown | Ceramic breakdown | Ceramic breakdown | Ceramic breakdown | Ceramic breakdown |
| Comparative Example 5 | Ceramic integrity | Ceramic crack | Ceramic breakdown | Ceramic breakdown | Ceramic breakdown | Ceramic breakdown |
| Comparative Example 6 | Ceramic integrity | Ceramic breakdown | Ceramic breakdown | Ceramic breakdown | Ceramic breakdown | Ceramic breakdown |
| Comparative Example 7 | Ceramic integrity | Ceramic crack | Ceramic breakdown | Ceramic breakdown | Ceramic breakdown | Ceramic breakdown |
| Comparative Example 8 | Ceramic integrity | Ceramic crack | Ceramic breakdown | Ceramic breakdown | Ceramic breakdown | Ceramic breakdown |
| Comparative Example 9 | Ceramic integrity | Ceramic breakdown | Ceramic breakdown | Ceramic breakdown | Ceramic breakdown | Ceramic breakdown |

The ceramic integrity means that the flame-retardant, thermal-insulating, and fireproof materials for batteries prepared in the examples had intact material surfaces and no significant defects after the deflagration tests.

The ceramic crack means that significant cracks appeared on the surface of the flame-retardant, thermal-insulating, and fireproof materials for batteries prepared in the examples after deflagration tests.

The ceramic breakdown means that significant holes and cracks appeared on the surface of the flame-retardant, thermal-insulating, and fireproof materials for batteries prepared in the examples after deflagration tests.

Figure 2:
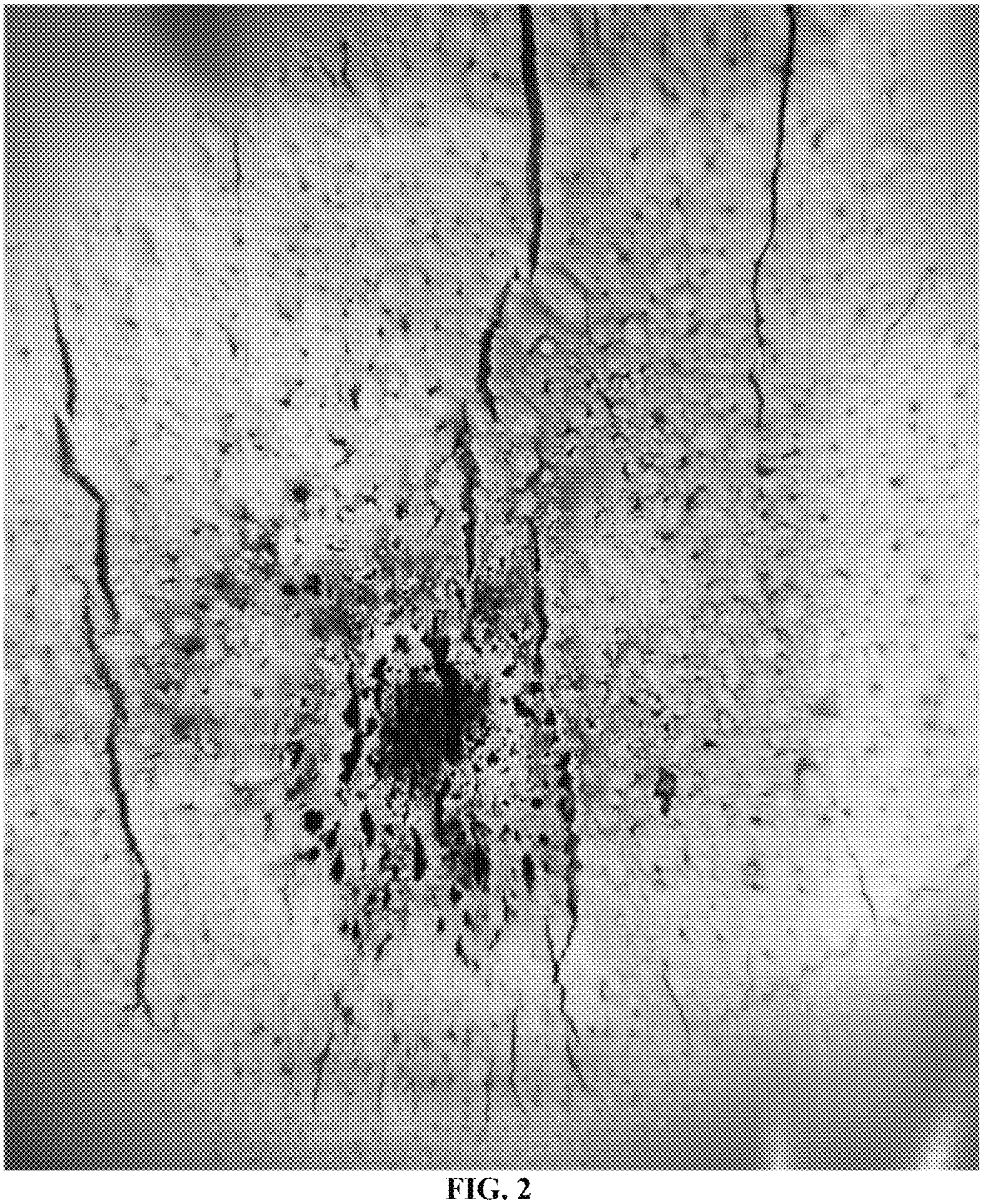
FIG. 2 is a picture showing a ceramic crack state of the flame-retardant, thermal-insulating, and fireproof material for batteries prepared in Example 17 of the present invention after a deflagration test under flame impingement at 1500° C. and 7 standard atmospheres for 15 min.
Figure 3:
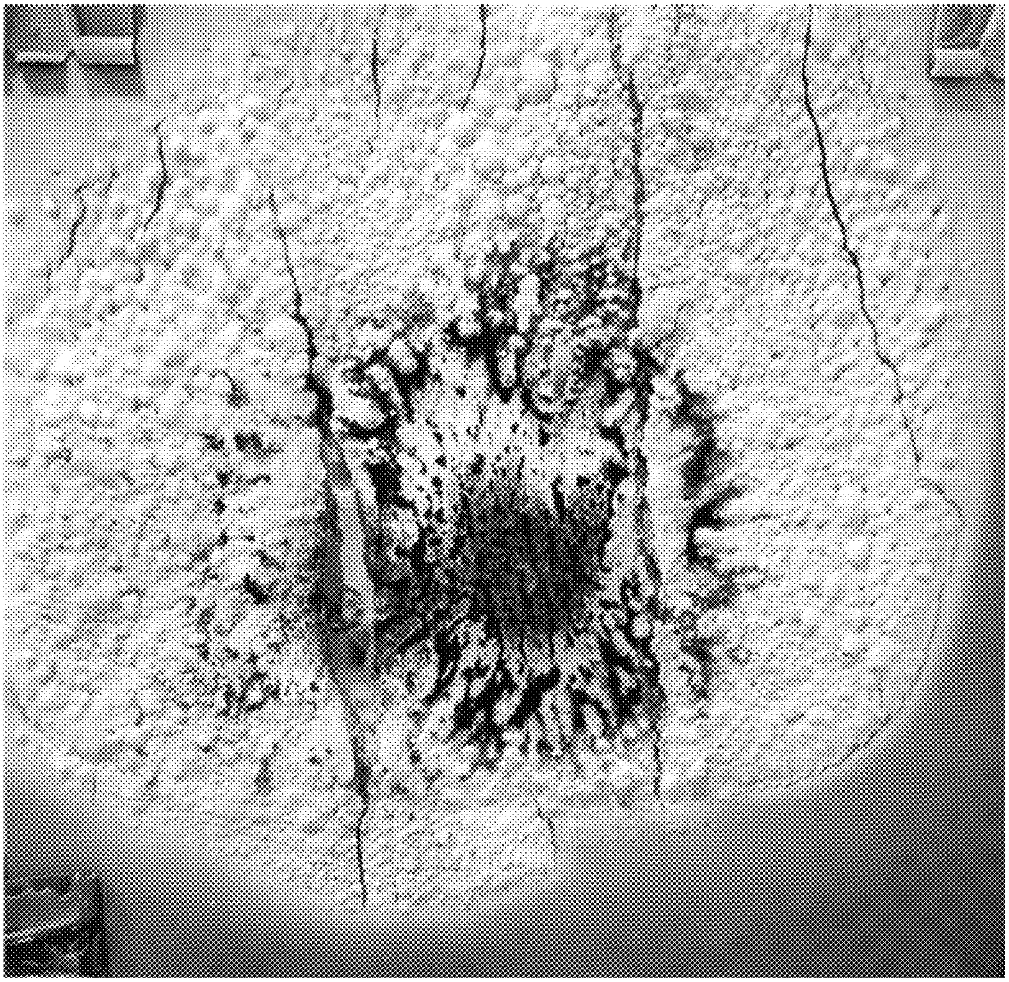
FIG. 3 is a picture showing a ceramic breakdown state of the flame-retardant, thermal-insulating, and fireproof material for batteries prepared in Example 17 of the present invention after a deflagration test under flame impingement at 1500° C. and 10 standard atmospheres for 15 min.

The states of ceramic integrity, ceramic crack, and ceramic breakdown can be seen in FIGS. 1 to 3. Actually, the material in each example and comparative example had slightly different morphology after the deflagration test. As can be seen from Table 1, the intact main bodies of the materials in Examples 4-17 are all ensured after the flame impingement at 1500° C. and 3 standard atmospheres for 30 min, and at this time, the thermal-insulating and fireproof functions of the materials in Comparative Examples 1-9 had failed.

The performance of the thermal-insulating and fireproof functions of the materials in Examples 4-17 was reduced under the flame impingement at 1500° C. and 5 standard atmospheres for 30 min, but the thermal-insulating and fireproof functions still existed. The thermal-insulating and fireproof functions of the materials in Comparative Examples 1-9 all failed.

The thermal-insulating and fireproof functions of the materials in part of Examples 4-17 still existed under the flame impingement at 1500° C. and 5 standard atmospheres for 15 min, and the thermal-insulating and fireproof functions of the materials in Comparative Examples 1-9 all failed.

The thermal-insulating and fireproof functions of the materials in part of Examples 4-17 and all Comparative Examples 1-9 failed under the flame impingement at 1500° C. and 7 standard atmospheres for 15 min.

had better performance when the content of the high-melting-point glass powder was higher than that of the low-melting-point glass powder, such as materials in Examples 12-17. When the contents of the high-melting-point glass powder and the low-melting-point glass powder were equal, the performance was reduced. It is presumed that since the temperature rose quickly during the deflagration and the temperature reached 1500° C. quickly, the glass powder needed to be in a molten state at 1500° C. for a long time when the combustion was performed at 1500° C. for a long time.

Flame-retardant and thermal-insulating layers were separately prepared according to the raw material ratios of the flame-retardant and thermal-insulating layers formed in Examples 4-17 and Comparative Examples 1-9, and deflagration tests were performed at different pressures. The specific results are shown in Table 2.

TABLE 2

Deflagration tests for materials in Examples 4-17 and Comparative Examples 1-9 without the state of bonding glass fiber

| | Flame impingement at 1500° C. and 1 standard atmosphere for 15 min | Flame impingement at 1500° C. and 1.2 standard atmospheres for 15 min | Flame impingement at 1500° C. and 1.5 standard atmospheres for 15 min | Flame impingement at 1500° C. and 2 standard atmospheres for 15 min |
|---|---|---|---|---|
| Example 4 | Ceramic integrity | Ceramic integrity | Ceramic breakdown | Ceramic breakdown |
| Example 5 | Ceramic integrity | Ceramic integrity | Ceramic crack | Ceramic breakdown |
| Example 6 | Ceramic integrity | Ceramic integrity | Ceramic crack | Ceramic breakdown |
| Example 7 | Ceramic integrity | Ceramic integrity | Ceramic crack | Ceramic breakdown |
| Example 8 | Ceramic integrity | Ceramic integrity | Ceramic crack | Ceramic breakdown |
| Example 9 | Ceramic integrity | Ceramic integrity | Ceramic crack | Ceramic breakdown |
| Example 10 | Ceramic integrity | Ceramic integrity | Ceramic breakdown | Ceramic breakdown |
| Example 11 | Ceramic integrity | Ceramic integrity | Ceramic crack | Ceramic breakdown |
| Example 12 | Ceramic integrity | Ceramic integrity | Ceramic crack | Ceramic breakdown |
| Example 13 | Ceramic integrity | Ceramic integrity | Ceramic crack | Ceramic breakdown |
| Example 14 | Ceramic integrity | Ceramic integrity | Ceramic crack | Ceramic breakdown |
| Example 15 | Ceramic integrity | Ceramic integrity | Ceramic crack | Ceramic breakdown |
| Example 16 | Ceramic integrity | Ceramic integrity | Ceramic crack | Ceramic breakdown |
| Example 17 | Ceramic integrity | Ceramic integrity | Ceramic crack | Ceramic breakdown |
| Comparative Example 1 | Ceramic crack | Ceramic breakdown | Ceramic breakdown | Ceramic breakdown |
| Comparative Example 2 | Ceramic integrity | Ceramic breakdown | Ceramic breakdown | Ceramic breakdown |
| Comparative Example 3 | Ceramic crack | Ceramic breakdown | Ceramic breakdown | Ceramic breakdown |
| Comparative Example 4 | Ceramic crack | Ceramic breakdown | Ceramic breakdown | Ceramic breakdown |
| Comparative Example 5 | Ceramic integrity | Ceramic breakdown | Ceramic breakdown | Ceramic breakdown |
| Comparative Example 6 | Ceramic crack | Ceramic breakdown | Ceramic breakdown | Ceramic breakdown |
| Comparative Example 7 | Ceramic crack | Ceramic breakdown | Ceramic breakdown | Ceramic breakdown |
| Comparative Example 8 | Ceramic integrity | Ceramic breakdown | Ceramic breakdown | Ceramic breakdown |
| Comparative Example 9 | Ceramic integrity | Ceramic breakdown | Ceramic breakdown | Ceramic breakdown |

The thermal-insulating and fireproof functions of the materials in Examples 4-17 and Comparative Examples 1-9 all failed under the flame impingement at 1500° C. and 10 standard atmospheres for 15 min.

As can be seen from Table 1, the performance of the materials in Examples 4-17 was completely better than that of the materials in Comparative Examples 1-9, indicating that the thermal-insulating and fireproof materials with molten state full coverage have better performance than that of the thermal-insulating and fireproof materials with molten state partial coverage. From the states of the materials in Examples 4-17 at different temperatures and atmospheres, it can be seen that the thermal-insulating and fireproof material As can be seen from Table 2, the materials in Examples 4-17 and Comparative Examples 1-9 could not pass the deflagration test under the condition of flame impingement at 1500° C. and 2 standard atmospheres for 15 min if there was no impact-resistant layer, that is, the thermal-insulating and fireproof performance of the flame-retardant and thermal-insulating layer was insufficient if it was not bonded to the impact-resistant layer. Meanwhile, in the deflagration test under the condition of flame impingement at 1500° C. and 1 standard atmosphere for 15 min, the main structures of most of the flame-retardant and thermal-insulating layers in Comparative Examples 1-9 were broken and could not be used normally. In contrast, Examples 4-17 exhibited cracks and breakdown of the ceramic phase when the deflagration test was performed under the condition of flame impingement at 1500° C. and 1.5 standard atmospheres for 15 min.

The materials in Examples 4-17 were subjected to deflagration tests at different temperatures, as shown in Table 3.

TABLE 3

Deflagration tests for materials in Examples 4-17 and Comparative Examples 1-9 after bonding glass fiber at different temperatures

| | Flame impingement at 700° C. and 5 standard atmospheres for 15 min | Flame impingement at 1000° C. and 5 standard atmospheres for 15 min | Flame impingement at 1500° C. and 5 standard atmospheres for 15 min |
|---|---|---|---|
| Example 4 | Ceramic integrity | Ceramic integrity | Ceramic crack |
| Example 5 | Ceramic integrity | Ceramic integrity | Ceramic integrity |
| Example 6 | Ceramic integrity | Ceramic integrity | Ceramic integrity |
| Example 7 | Ceramic integrity | Ceramic integrity | Ceramic integrity |
| Example 8 | Ceramic integrity | Ceramic integrity | Ceramic integrity |
| Example 9 | Ceramic integrity | Ceramic integrity | Ceramic integrity |
| Example 10 | Ceramic integrity | Ceramic integrity | Ceramic crack |
| Example 11 | Ceramic integrity | Ceramic integrity | Ceramic integrity |
| Example 12 | Ceramic integrity | Ceramic integrity | Ceramic integrity |
| Example 13 | Ceramic integrity | Ceramic integrity | Ceramic integrity |
| Example 14 | Ceramic integrity | Ceramic integrity | Ceramic integrity |
| Example 15 | Ceramic integrity | Ceramic integrity | Ceramic integrity |
| Example 16 | Ceramic integrity | Ceramic integrity | Ceramic integrity |
| Example 17 | Ceramic integrity | Ceramic integrity | Ceramic integrity |
| Comparative Example 1 | Ceramic integrity | Ceramic crack | Ceramic breakdown |
| Comparative Example 2 | Ceramic breakdown | Ceramic breakdown | Ceramic breakdown |
| Comparative Example 3 | Ceramic integrity | Ceramic breakdown | Ceramic breakdown |
| Comparative Example 4 | Ceramic integrity | Ceramic crack | Ceramic breakdown |
| Comparative Example 5 | Ceramic breakdown | Ceramic breakdown | Ceramic breakdown |
| Comparative Example 6 | Ceramic integrity | Ceramic crack | Ceramic breakdown |
| Comparative Example 7 | Ceramic breakdown | Ceramic breakdown | Ceramic breakdown |
| Comparative Example 8 | Ceramic breakdown | Ceramic breakdown | Ceramic breakdown |
| Comparative Example 9 | Ceramic breakdown | Ceramic breakdown | Ceramic breakdown |

As can be seen from Table 3, the thermal-insulating and fireproof performance of the materials in Examples 4-17 could basically be ensured under the flame impingement at 700° C. and 5 standard atmospheres for 15 min and under the flame impingement at 1000° C. and 5 standard atmospheres for 15 min. The materials in Comparative Examples 1-9 had different states according to the addition of different glass powders. At 700° C., the basic thermal-insulating and fireproof performance of the material with the addition of low-melting-point glass powders in the comparative example could still be ensured, and the material with the addition of high-melting-point glass powders in the comparative example could not form an intact ceramic layer after low-temperature combustion for a long time.

Only when the temperature could rise quickly to 1500° C., the addition of the high-melting-point glass powders alone was effective.

According to the above experiments, the flame-retardant and thermal-insulating material having the glass powder with the molten-state temperature range encompassing 300° C. to 1500° C. in the present application has better performance than the flame-retardant and thermal-insulating material only having the glass powder with a single initial melting temperature. The material can resist a high temperature of 1500° C. in a high-pressure environment for a long time, and the principle is that part of glass powders can be always kept in the molten state at a temperature of above 350° C., so that the silicon dioxide matrix and the glass powders are continuously bonded, and the continuity, integrity, and compactness of a ceramic layer are kept as far as possible. If only the glass powder with a single initial melting temperature is added, the material can only resist low-temperature combustion or the ceramic layer breaks down during the low-temperature combustion.

Generally, the thicker the total thickness of the material is, the better the impact resistance, flame retardant, and thermal insulation performance of the material are. In the present embodiment, the total thickness of the material to be tested is about 1 mm. However, the thickness of the material of the present application is not limited to the thickness disclosed in the embodiment, and in different application scenarios, the thickness of the impact-resistant layer, the thickness of the flame-retardant and thermal-insulating layer, and the total thickness of the material can be set according to actual requirements.

The invention claimed is:

1. A flame-retardant, thermal-insulating, and fireproof material for batteries, comprising a flame-retardant and thermal-insulating layer and an impact-resistant layer, wherein the flame-retardant and thermal-insulating layer is applied to the surface of the impact-resistant layer; the flame-retardant and thermal-insulating layer and the impact-resistant layer are in a thickness ratio of (2-10):1; the flame-retardant and thermal-insulating layer comprises organic silicone rubber, a ceramic-forming filler, a flame retardant, and an auxiliary agent, and further comprises several glass powders with different initial melting temperatures; molten-state temperature ranges of the several glass powders cover 300° C. to 1500° C.; and the impact-resistant layer is glass fiber cloth.

2. The flame-retardant, thermal-insulating, and fireproof material for batteries according to claim 1, wherein the impact-resistant layer is formed by bonding multiple layers of glass fiber cloth.

3. The flame-retardant, thermal-insulating, and fireproof material for batteries according to claim 1, wherein the glass powders comprise glass powder A with a molten-state temperature range encompassing 300° C. to 700° C. and glass powder B with a molten-state temperature range encompassing 700° C. to 1500° C.; the glass powder A and the glass powder B are in a ratio of (1-2):(1-3) by mass ratio.

4. The flame-retardant, thermal-insulating, and fireproof material for batteries according to claim 1, wherein the glass powders comprise glass powder C with a molten-state temperature range encompassing 300° C. to 550° C., glass powder D with a molten-state temperature range encompassing 550° C. to 900° C., and glass powder E with a molten-state temperature range encompassing 900° C. to 1500° C.; the glass powder C, the glass powder D, and the glass powder E are in a ratio of (1-2):(1-2):(2-3) by mass ratio.

5. The flame-retardant, thermal-insulating, and fireproof material for batteries according to claim 1, wherein the glass powders comprise glass powder F with a molten-state temperature range encompassing 300° C. to 800° C., glass powder G with a molten-state temperature range encompassing 600° C. to 1000° C., glass powder H with a molten-state temperature range encompassing 700° C. to 1250° C., and glass powder I with a molten-state temperature range encompassing 1000° C. to 1500° C.; the glass powder F, the glass powder G, the glass powder H, and the glass powder I are in a ratio of (1-3):(1-3):(1-3):(1-3) by mass ratio.

6. The flame-retardant, thermal-insulating, and fireproof material for batteries according to claim 5, wherein the metal oxide comprises one or more selected from lead oxide, aluminum oxide, lithium oxide, zinc oxide, titanium oxide, magnesium oxide, vanadium oxide, barium oxide, sodium oxide, calcium oxide, strontium oxide, tin oxide, bismuth oxide, and antimony oxide.

7. The flame-retardant, thermal-insulating, and fireproof material for batteries according to claim 1, wherein raw materials of the glass powder comprise one or more selected from silicon oxide, boron oxide, and a metal oxide.

8. The flame-retardant, thermal-insulating, and fireproof material for batteries according to claim 1, wherein the flame-retardant, thermal-insulating, and fireproof material will not be burned through under flame impingement at 1500° C. for at least 30 min.

9. A flame-retardant, thermal-insulating, and fireproof material for batteries, comprising a flame-retardant and thermal-insulating layer and an impact-resistant layer, wherein the flame-retardant and thermal-insulating layer is applied to the surface of the impact-resistant layer; the flame-retardant and thermal-insulating layer and the impact-resistant layer are in a thickness ratio of (2-10):1; the flame-retardant and thermal-insulating layer comprises organic silicone rubber, a ceramic-forming filler, a flame retardant, and an auxiliary agent, and further comprises several glass powders with different initial melting temperatures; molten-state temperature ranges of the several glass powders cover 300° C. to 1500° C.; wherein the glass powders comprise glass powder F with a molten-state temperature range encompassing 300° C. to 800° C., glass powder G with a molten-state temperature range encompassing 600° C. to 1000° C., glass powder H with a molten-state temperature range encompassing 700° C. to 1250° C., and glass powder I with a molten-state temperature range encompassing 1000° C. to 1500° C.; the glass powder F, the glass powder G, the glass powder H, and the glass powder I are in a ratio of (1-3):(1-3):(1-3):(1-3) by mass ratio; wherein the raw materials of the glass powder further comprise stannous fluoride.

10. A flame-retardant, thermal-insulating, and fireproof material for batteries, comprising a flame-retardant and thermal-insulating layer and an impact-resistant layer, wherein the flame-retardant and thermal-insulating layer is applied to the surface of the impact-resistant layer; the flame-retardant and thermal-insulating layer and the impact-resistant layer are in a thickness ratio of (2-10):1; the flame-retardant and thermal-insulating layer comprises organic silicone rubber, a ceramic-forming filler, a flame retardant, and an auxiliary agent, and further comprises several glass powders with different initial melting temperatures; molten-state temperature ranges of the several glass powders cover 300° C. to 1500° C.; wherein the flame-retardant and thermal-insulating layer comprises, in parts by mass, 40-60 parts of the organic silicone rubber, 20-30 parts of the ceramic-forming filler, 15-25 parts of the flame retardant, 2-10 parts of the glass powders, and 2-5 parts of the auxiliary agent.

11. The flame-retardant, thermal-insulating, and fireproof material for batteries according to claim 10, wherein the flame-retardant and thermal-insulating layer further comprises 10-17 parts of an extending filler.

* * * * *